United States Patent
Stauche et al.

(10) Patent No.: US 12,305,545 B2
(45) Date of Patent: May 20, 2025

(54) TRANSMISSION FOR A MOTOR VEHICLE

(71) Applicant: Dr. Ing. h.c. F. Porsche Aktiengesellschaft, Stuttgart (DE)

(72) Inventors: Robin Stauche, Frankfurt am Main (DE); Moritz Jurisch, Sindelfingen (DE); Dominik Elsaesser, Laufach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/520,594

(22) Filed: Nov. 28, 2023

(65) Prior Publication Data
US 2024/0183292 A1 Jun. 6, 2024

(30) Foreign Application Priority Data
Dec. 2, 2022 (DE) ...................... 10 2022 132 065.0

(51) Int. Cl.
*F01M 1/12* (2006.01)
*F16H 57/04* (2010.01)

(52) U.S. Cl.
CPC ........... *F01M 1/12* (2013.01); *F16H 57/0404* (2013.01); *F01M 2001/126* (2013.01)

(58) Field of Classification Search
CPC ..... F01M 1/12; F16H 57/0435; F16H 57/027; F16H 57/0409
See application file for complete search history.

(56) References Cited

U.S. PATENT DOCUMENTS

| | | | | |
|---|---|---|---|---|
| 2,064,703 | A | * | 12/1936 | Van De Graaff ........ F16J 15/40 277/927 |
| 3,435,612 | A | * | 4/1969 | Hensler ................... F16H 61/64 123/196 R |
| 3,489,034 | A | * | 1/1970 | Moore ................ F16H 57/0409 74/606 R |
| 3,800,913 | A | * | 4/1974 | Schmitt ..................... F01M 1/12 74/606 R |
| 3,942,716 | A | * | 3/1976 | Jacobson ................. F16J 15/40 184/6.16 |
| 4,168,638 | A | * | 9/1979 | Usui ................... F16H 61/0021 475/136 |
| 4,632,650 | A | * | 12/1986 | Frieden .................... F16J 15/40 96/201 |
| 4,697,553 | A | * | 10/1987 | Lie ........................... F01M 3/00 123/196 R |

(Continued)

FOREIGN PATENT DOCUMENTS

| CN | 108128147 A | 6/2018 |
|---|---|---|
| DE | 102009016574 A1 | 11/2009 |

(Continued)

*Primary Examiner* — Michael A Riegelman
(74) *Attorney, Agent, or Firm* — LEYDIG, VOIT & MAYER, LTD.

(57) ABSTRACT

A transmission for a motor vehicle includes a housing with a gear set with a transmission input shaft and a transmission output shaft, and with a lubrication system, which includes a conveyor for conveying a lubricant mixture from the housing. A dry-sump lubrication can be brought about with the aid of the conveyor. A negative pressure in the housing is controllable in order to reliably bring about the dry-sump lubrication.

11 Claims, 5 Drawing Sheets

(56) References Cited

U.S. PATENT DOCUMENTS

| | | | | |
|---|---|---|---|---|
| 4,750,456 | A * | 6/1988 | Ladrach | F01M 11/12 |
| | | | | 123/196 S |
| 4,762,201 | A * | 8/1988 | Malik | F16N 19/003 |
| | | | | 184/6.13 |
| 4,821,799 | A * | 4/1989 | Wong | E21B 33/072 |
| | | | | 277/330 |
| 5,101,936 | A * | 4/1992 | Paredes | F16H 57/0447 |
| | | | | 184/6.13 |
| 6,374,949 | B2 * | 4/2002 | Schwertberger | F16H 57/027 |
| | | | | 74/467 |
| 6,457,564 | B1 * | 10/2002 | Damm | F16H 57/0434 |
| | | | | 184/104.3 |
| 7,954,599 | B2 * | 6/2011 | Antonetti | F16H 57/0434 |
| | | | | 184/6.12 |
| 7,985,283 | B2 * | 7/2011 | Garcia | F16H 61/0021 |
| | | | | 96/211 |
| 8,997,934 | B2 * | 4/2015 | Nielsen | F03D 80/70 |
| | | | | 184/6.12 |
| 9,032,840 | B2 * | 5/2015 | Prior | F16H 57/0461 |
| | | | | 475/159 |
| 10,060,520 | B2 * | 8/2018 | Sterns | F16H 57/027 |
| 10,094,466 | B2 * | 10/2018 | Sterns | F16H 57/02 |
| 11,231,103 | B2 * | 1/2022 | Staake | F16H 57/0441 |
| 11,293,448 | B1 * | 4/2022 | Zhang | F04D 29/063 |
| 12,049,951 | B2 * | 7/2024 | Bohm | F01M 1/12 |
| 2005/0139427 | A1 * | 6/2005 | Antonetti | F16H 57/0434 |
| | | | | 184/6.12 |
| 2009/0050410 | A1 * | 2/2009 | Berberich | F01D 11/003 |
| | | | | 701/100 |
| 2012/0211307 | A1 * | 8/2012 | Nielsen | F03D 80/70 |
| | | | | 184/4 |
| 2016/0160856 | A1 * | 6/2016 | Wallin | F04B 53/08 |
| | | | | 62/468 |
| 2016/0305537 | A1 * | 10/2016 | Sterns | F16H 57/0409 |
| 2016/0369886 | A1 * | 12/2016 | Sterns | F16H 57/0435 |
| 2024/0183292 | A1 * | 6/2024 | Stauche | F16H 57/0409 |

FOREIGN PATENT DOCUMENTS

| | | |
|---|---|---|
| DE | 102011015733 A1 | 12/2011 |
| DE | 102014008116 A1 | 12/2015 |
| DE | 102015004991 B3 | 8/2016 |
| DE | 102015211885 A1 | 12/2016 |
| EP | 0137596 A1 | 4/1985 |
| EP | 1016809 A2 | 7/2000 |
| EP | 4124780 A1 | 2/2023 |

* cited by examiner

TRANSMISSION FOR A MOTOR VEHICLE

CROSS REFERENCE TO RELATED APPLICATIONS

This application claims benefit to German Patent Application No. DE 10 2022 132 065.0, filed on Dec. 2, 2022, which is hereby incorporated by reference herein.

FIELD

The invention relates to a transmission for a motor vehicle.

BACKGROUND

Transmissions for motor vehicles, also for motor vehicles with an electric drive, are generally known. The transmission serves to transform an input speed of an input shaft of the transmission into a demand-based output speed of an output shaft of the transmission. The transmission usually has gear pairs that are engaged with one another.

Publications EP 1 016 809 A2, U.S. Pat. No. 3,489,034 A and DE 10 2015 004 991 B3 disclose a high-speed transmission for driving generators by turbines, wherein a partial vacuum is generated in a transmission housing with the aid of a pump.

Publication DE 10 2011 015 733 A1 discloses a transmission for a motor vehicle, wherein a negative pressure or a partial vacuum can likewise be generated in the transmission with the aid of a pump.

Publication EP 0 137 596 A1 discloses a transmission for a motor vehicle, wherein the transmission comprises a dry-sump lubrication, a transmission housing of the transmission being connected to a vacuum source of an internal combustion engine with the aid of a control valve in order to generate a defined negative pressure in the transmission housing.

SUMMARY

In an embodiment, the present disclosure provides a transmission for a motor vehicle, comprising a housing with a gear set with a transmission input shaft and a transmission output shaft, and with a lubrication system, which comprises a conveying means for conveying a lubricant mixture from the housing. A dry-sump lubrication can be brought about with the aid of the conveying means. A negative pressure in the housing is controllable in order to reliably bring about the dry-sump lubrication.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
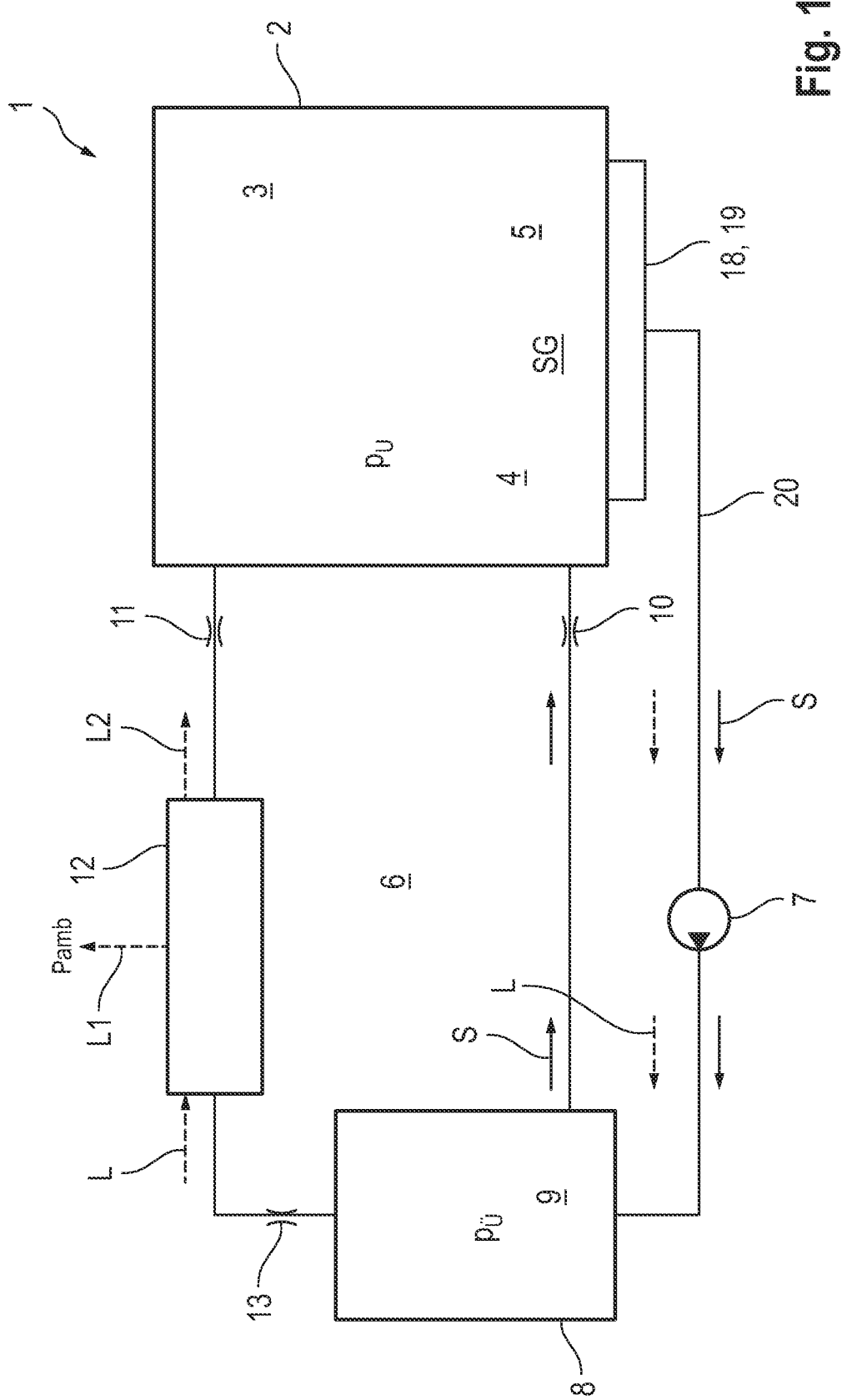
FIG. 1 illustrates a schematic representation of a transmission according to an embodiment of the invention for a motor vehicle.

In an embodiment, the present invention provides an improved transmission for a motor vehicle.

In a transmission according to an embodiment of the invention for a motor vehicle, wherein the transmission comprises a housing with a gear set with a transmission input shaft and a transmission output shaft, and with a lubrication system, which comprises a conveying means for conveying a lubricant mixture out of the housing, wherein a dry-sump lubrication is brought about with the aid of the conveying means, a negative pressure in the housing is controllable in order to reliably bring about the dry-sump lubrication. An advantage of embodiments of the invention is that so-called off-load losses, i.e., losses, such as friction losses during idling, can be reduced. Losses in a powertrain of the motor vehicle can thus be reduced so that an efficient powertrain can be realized. Since available energy is limited, in particular in a battery-powered motor vehicle, the transmission according to an embodiment of the invention can lead to an improved range of the motor vehicle.

The reduction of the off-load losses, which are present both statically and dynamically, relates in particular to sealing, splashing and ventilation losses. Advantageously, with the aid of the transmission according to an embodiment of the invention, an increase in the efficiency under load and in coasting phases can be achieved.

In an embodiment of the transmission according to an embodiment of the invention, the negative pressure in the housing is controllable with the aid of a throttle formed in the lubrication system, so that simple structural components in the transmission can be used advantageously cost-effectively.

Advantageously, the conveying means is designed in the form of an electric pump, the pumping power of which is controllable, so that an amount of lubricant to be sucked from the housing can be controlled in a simple manner.

In an embodiment, the lubrication system comprises a lubricant reservoir with a means for the material separation of the lubricant mixture into lubricant and air, wherein the means is advantageously designed in particular in the form of a centrifuge.

The negative pressure can be controlled in a simple manner with the aid of the first throttle designed for the lubricant to flow through and/or the second throttle designed for the air to flow through and/or the third throttle of the lubrication system designed for the air to flow through.

A further, improved control of the negative pressure can be achieved by the throttle being controllable.

Additional advantages, features and details of embodiments of the invention arise from the following description of preferred exemplary embodiments and with reference to the drawing. The features and feature combinations specified in the above description, as well as the features and feature combinations specified below in the description of the drawings and/or shown alone in the figures, can be used not only in the respectively specified combination but also in other combinations or on their own, without departing from the scope of the invention. Identical or functionally identical elements are associated with identical reference signs.

FIG. 1 illustrates a schematic representation of a transmission 1 according to an embodiment of the invention, wherein this representation is a rough schematic. The transmission 1 according to an embodiment of the invention is furthermore shown in a detailed schematic representation in FIG. 2.

The transmission 1, which is provided for a motor vehicle, in particular for a motor vehicle with an electric drive, comprises a housing 2, in which a gear set 3 with a transmission input shaft 4 and a transmission output shaft 5 is arranged. The transmission 1 is associated with a lubrication system 6 for supplying the gear set 3 with a lubricant mixture SG. The lubricant mixture SG consists of air L and lubricant S.

At this point, it should be noted that the lubricant S flowing through the lubrication system 6, which is in particular designed in the form of a circuit, undergoes an introduction of air L, in particular due to circulation in the circuit, and is thus generally formed as a lubricant mixture SG in the lubrication system 6. The air L and the resulting material change of the lubricant S can lead to faster, unfavorable vapor bubble formation and/or to increased friction in the gear set 3 due to different material properties of the air L and of the lubricant S.

The lubrication system 6 comprises a conveying means 7 for conveying the lubricant mixture SG in a circuit-like manner, wherein the lubricant mixture SG is sucked from the housing 2 and fed back to the housing 2 in an altered form. The conveying means 7 is advantageously designed in the form of an electrically operable pump, the pumping power of which is controllable. The lubricant mixture SG is altered to the extent that it is fed to a lubricant reservoir 8, and is separated into the two components of air L and lubricant S with the aid of a means 9 for material separation, the means 9 in the present exemplary embodiment being designed in the form of a centrifuge. Or, in other words, the lubricant mixture SG is degassed. It should furthermore be noted that even with the aid of the means 9, the component lubricant S in the lubrication system 6 is of course present not entirely separated from the air L. In other words, a certain, but minimal, amount of air L is also present in the lubricant S. This is a much smaller portion downstream of the means 9 and upstream of the housing 2 than upstream of the means 9 and downstream of the housing 2.

The lubricant S is fed back to the housing 2 with the aid of a first throttle 10. The air L is fed to the housing 2 with the aid of a second throttle 11, wherein a compensating reservoir 12 of the lubrication system 6, to which the air L is fed with the aid of a third throttle 13, is arranged between the lubricant reservoir 8, which has a positive pressure $p_{\ddot{U}}$, and the housing 2. It should be noted at this point that the positive pressure $p_{\ddot{U}}$ is greater than the negative pressure $p_U$. In principle, a diameter of the first throttle 10 is greater than a diameter of the third throttle 13, which diameter in turn is greater than a diameter of the second throttle 11. This leads to a stable supply of the gear set 3 and to the correspondingly provided negative pressure $p_U$ being brought about in the housing 2.

From this compensating reservoir 12, a first air portion L1 is fed to an environment with an ambient pressure $p_{amb}$ and a second air portion L2 is fed with the aid of the second throttle 11 to the housing 2 in order to bring about the required negative pressure $p_U$. This means that the transmission 1 according to an embodiment of the invention comprises a dry-sump lubrication, which can be brought about with the aid of the controllable negative pressure $p_U$. In the present exemplary embodiment, the negative pressure $p_U$ is controlled with the aid of the second throttle 11. Likewise, the first throttle 10 and/or the third throttle 13 could also be designed to control the negative pressure $p_U$ or, in other words, be used functionally to control the negative pressure $p_U$. The third throttle 13 can also be designed to control the negative pressure $p_U$ and the positive pressure $p_{\ddot{U}}$ in the lubricant reservoir 8.

Figure 2:
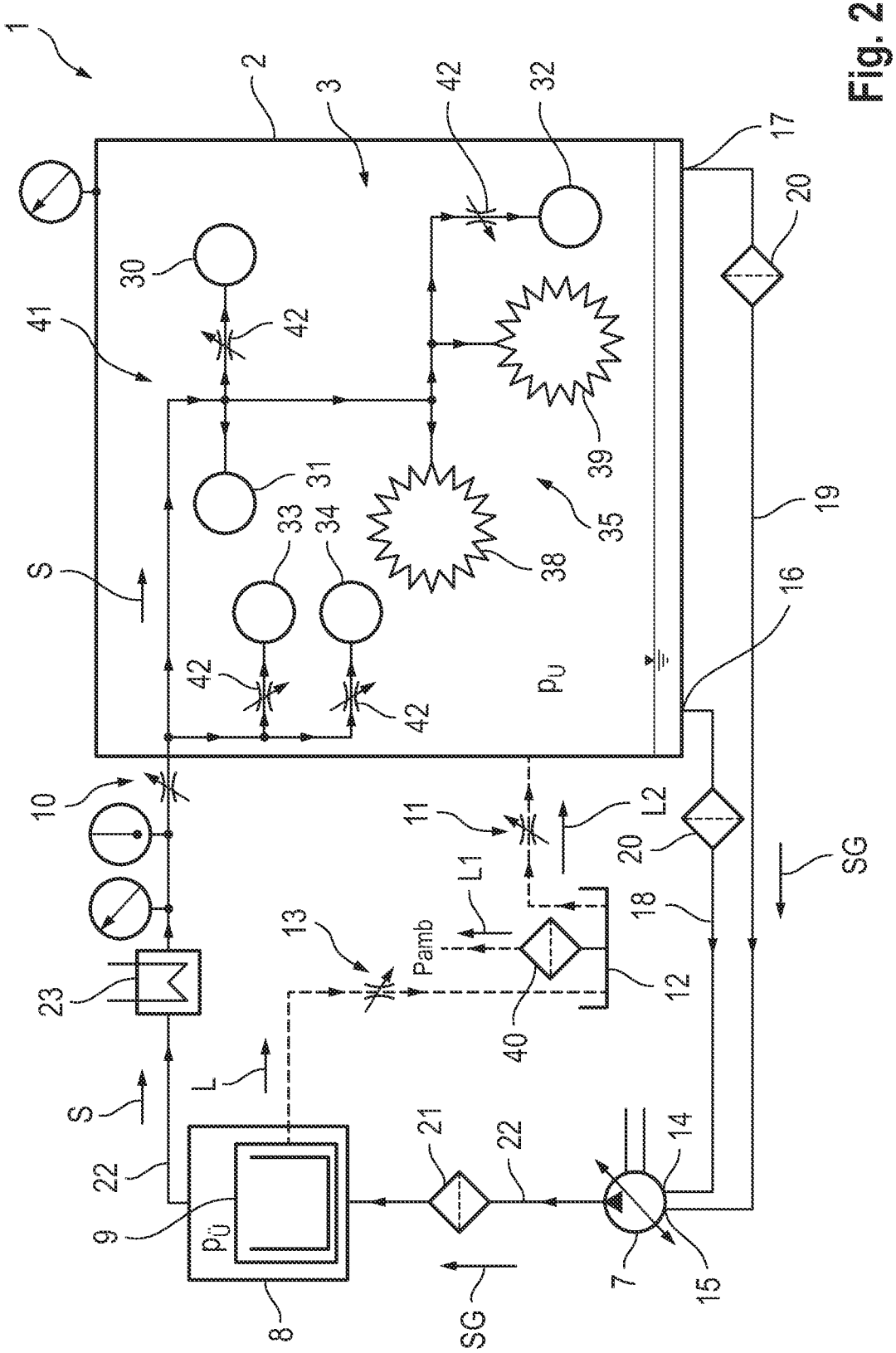
FIG. 2 illustrates a detailed schematic representation of a transmission according to an embodiment of the invention according to FIG. 1.

FIG. 2 shows the transmission 2 according to an embodiment of the invention in the detailed schematic representation. For the preferred control of the negative pressure $p_U$, the conveying means 7 is designed in the form of the electric, controllable pump. This electric pump 7 furthermore advantageously comprises a first suction side 14 and a second suction side 15, wherein the first suction side 14 and the second suction side 15 are connected, so as to allow flow-through, to the housing 2 with the aid of a first conveying line 18 to a first location 16 of the housing 2 and with the aid of a second conveying line 19 to a second location 17 of the housing 2, respectively. The first location 16 is spaced apart from the second location 17 in such a way that the lubricant mixture SG can be reliably sucked as a function of different orientations of the housing 2. Each of the two conveying lines 18, 19 has a lubricant filter 20. Likewise, the conveying means 7 could also have only one suction side 14; 15.

Downstream of the conveying means 7, a further lubricant filter 21 of the lubrication system 6 is received, so as to allow flow-through, in a system line 22, allowing flow-through, of the lubrication system 6. The conveying means 7 conveys the lubricant mixture SG sucked from the housing 2 into the system line 22 in a controlled manner.

The lubricant reservoir 8, comprising the means 9 in the form of the centrifuge, is arranged downstream of the further lubricant filter 21 in the lubrication system 6. After separation of the lubricant mixture SG into air L and lubricant S and before the lubricant S is fed to the housing 2, said lubricant is cooled with the aid of a heat exchange 23 via the system line 22, which is connected to the lubricant reservoir 8 so as to allow flow-through.

The air L is conveyed with the aid of the third throttle 13 from the lubricant reservoir 8 into the compensating reservoir 12 and, as already described above, is divided into the first air portion L1 and the second air portion L2. The first air portion L1 is filtered with the aid of an additional lubricant filter 40 before it enters the environment. The throttles 10, 11, 13 are each designed as controllable throttles. The throttle 10; 11; 13 could, for example, be designed in a simplest design in the form of a screw with a hole.

The second throttle 11 is connected to the housing 2 so as to allow flow-through and is designed in the present exemplary embodiment to be screwed into the housing. The second throttle 11 could likewise be received in the compensating reservoir 12.

Figure 3:
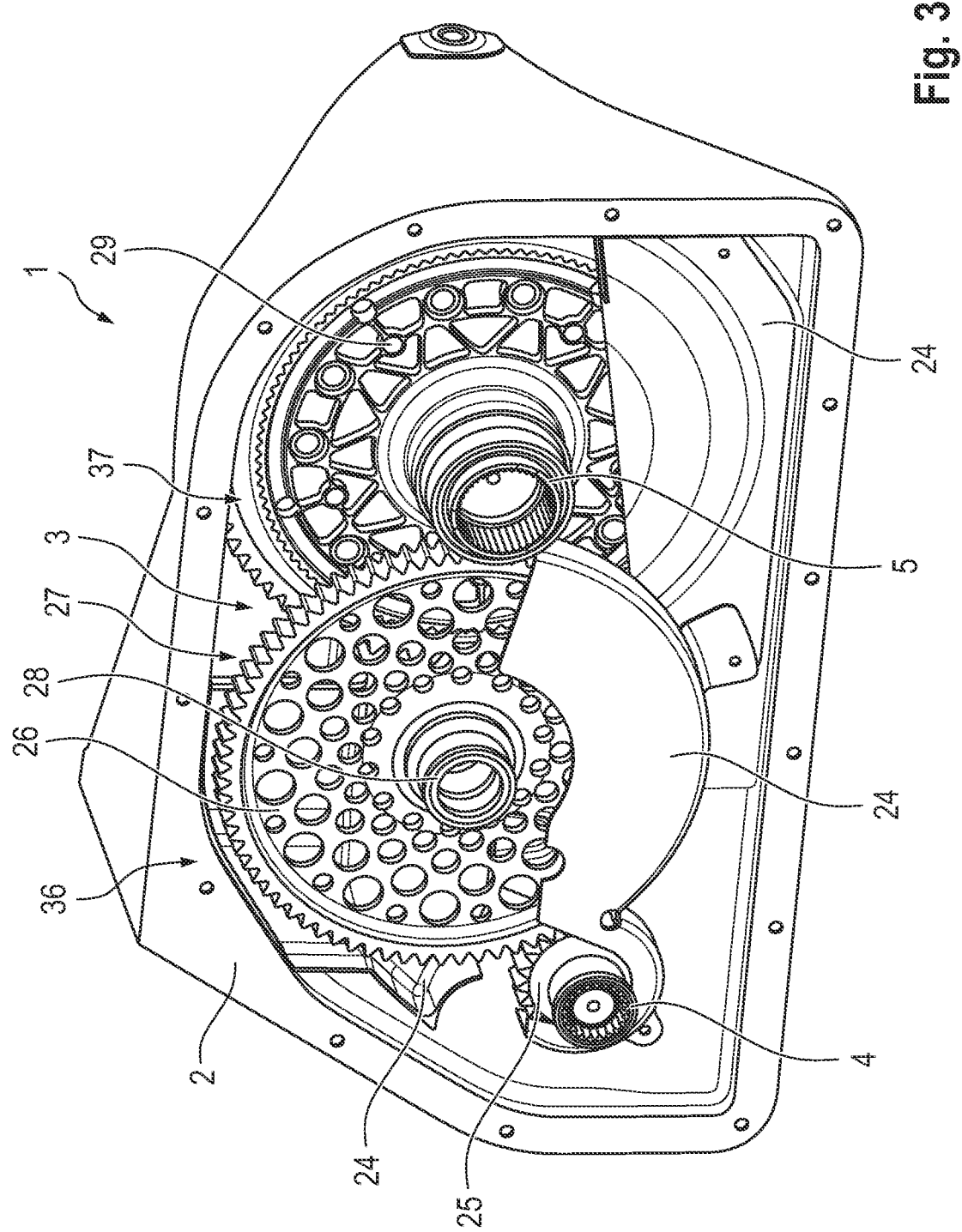
FIG. 3 illustrates a perspective side view of the transmission according to an embodiment of the invention with drainage elements.

As illustrated in particular in FIG. 3, the gear set 3 in the present exemplary embodiment comprises the transmission input shaft 4 with a first transmission gear 25, which is operatively connected to a second transmission gear 26. The second transmission gear 26 is connected to a third transmission gear 27 with the aid of a common shaft 28, wherein the third transmission gear 27 is connected via gear engagements with a fourth transmission gear 29, having the transmission output shaft 5.

With the aid of the lubrication system 6, a first bearing 30 and a second bearing 31 of the transmission input shaft 4, a third bearing 32 and a fourth bearing 33 of the transmission output shaft 5 as well as a fifth bearing 34 of the shaft 28 are in particular supplied with lubricant S. In order to supply lubricant to the bearings 30, 31, 32, 33, 34, a plurality of additional lines 41 of the lubrication system 6 are designed to branch off from the system line 22. The bearings 30, 32, 33, 34 are furthermore each associated with single throttles 42.

Due to the separation in the means 9, the lubricant S has a reduced proportion of the air L of the lubricant mixture SG, whereby a friction-reduced gear set 3 is realized. Additionally, a spraying device 35 of the lubrication system 6 is formed in the housing 3 and is designed to spray a first gear stage 36 of the gear set 3, comprising the first gear wheel 25 and the second gear wheel 26, and to spray a second gear stage 37 of the gear set 3, comprising the third gear wheel 27 and the fourth gear wheel 29. The spraying device 35 comprises a first spraying element 38 for spraying the first gear stage 36 and a second spraying element 39 for spraying the second gear stage 37. The spraying elements 38, 39 are supplied with lubricant with the aid of the plurality of additional lines 41.

Figure 4:
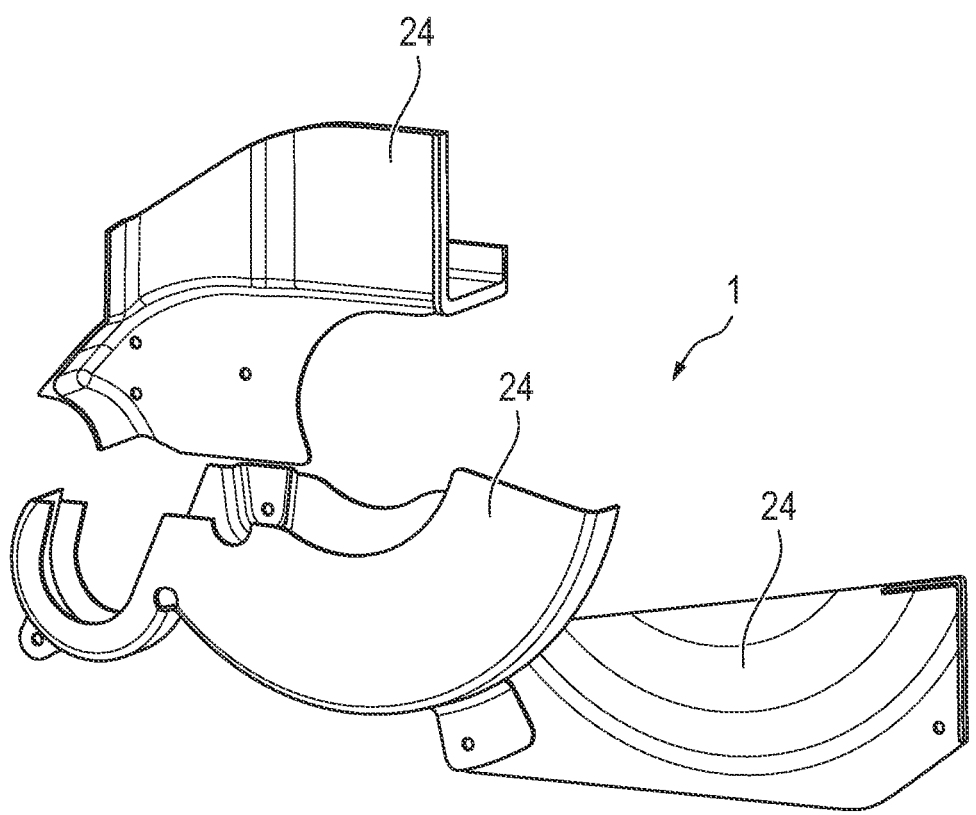
FIG. 4 illustrates a perspective side view of the drainage elements of the transmission according to FIG. 3.

FIG. 3 illustrates the transmission 2 according to an embodiment of the invention in a further exemplary embodiment. In order to improve the reduction of friction in the gear set 3, the drainage elements 24 are formed and at least partially comprise or cover the individual gear wheels 25, 26, 27, 29. For improved clarity, FIG. 4 illustrates the drainage elements 24 separately from the gear set 3. Any lubricant spatters flung into the housing 2 in a non-directed manner during operation of the transmission 2 due to, for example, centrifugal forces are purposefully collected with the aid of the drainage elements 24.

One or more sealing rings of the transmission 1 are designed to be adapted to the negative pressure $p_U$ prevailing in the housing 2.

Figure 5:
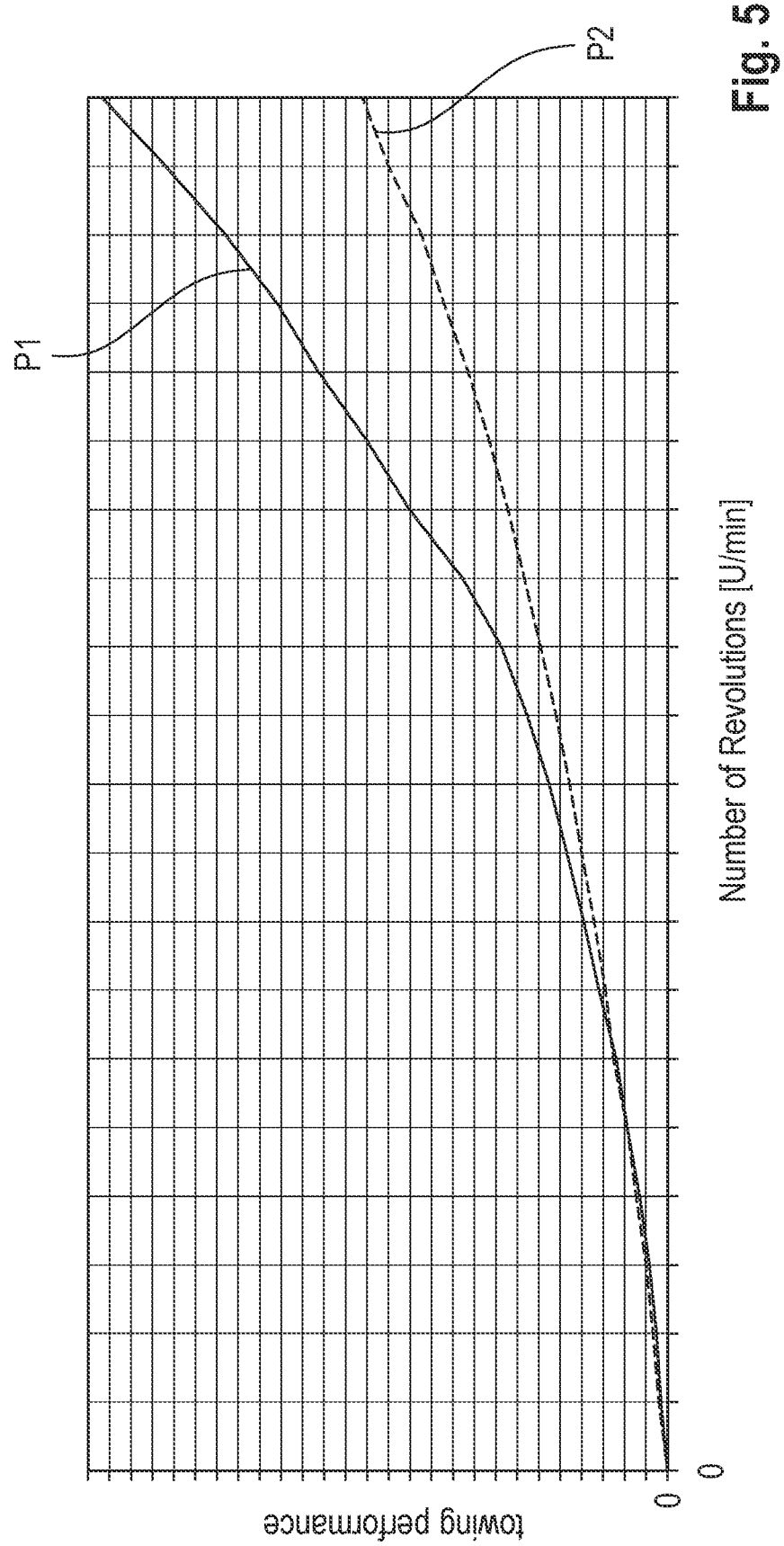
FIG. 5 illustrates a speed-power diagram of a power curve of a conventional transmission and a power curve of the transmission according to an embodiment of the invention.

FIG. 5 shows a speed-power diagram of a first power curve P1 of a transmission 1 according to the prior art and a second power curve P2 of the transmission 1 according to a further exemplary embodiment of the invention. With the aid of the transmission 1 according to an embodiment of the invention, a significant reduction in an energy demand for operating the transmission 1 is realized.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Transmission
Housing
Gear set
Transmission input shaft
Transmission output shaft
Lubrication system
Conveying means
Lubricant reservoir
Means for material separation
First throttle
Second throttle
Compensating reservoir
Third throttle
First suction side
Second suction side
First location
Second location
First conveying line
Second conveying line
Lubricant filter
Further lubricant filter
System line
Heat exchanger
Drainage element
First gear wheel
Second gear wheel
Third gear wheel
Shaft
Fourth gear wheel
First bearing
Second bearing
Third bearing
Fourth bearing
Fifth bearing
Spraying device
First gear stage
Second gear stage
First spraying element
Second spraying element
Additional lubricant filter
Plurality of additional lines
Single throttle
L Air
L1 First air portion
L2 Second air portion
P1 First power curve
P2 Second power curve
S Lubricant
SG Lubricant mixture
$p_{amb}$ Ambient pressure
$p_U$ Positive pressure
$p_U$ Negative pressure

The invention claimed is:

1. A transmission for a motor vehicle, comprising:
a housing with a gear set with a transmission input shaft and a transmission output shaft, and with a lubrication system, which comprises a conveying means for conveying a lubricant mixture from the housing, wherein a dry-sump lubrication can be brought about with the aid of the conveying means, wherein a negative pressure in the housing is controllable in order to reliably bring about the dry-sump lubrication, wherein the lubrication system comprises a lubricant reservoir with a separator configured to materially separate the lubricant mixture into lubricant and air, and wherein the negative pressure is controllable with the aid of a first throttle configured for the lubricant to flow through and/or with the aid of a second throttle configured for the air to flow through and/or with the aid of a third throttle of the lubrication system configured for the air to flow through.

2. The transmission according to claim 1, wherein the negative pressure in the housing is controllable with the aid of the first throttle, the second throttle, and/or the third throttle formed in the lubrication system.

3. The transmission according to claim 1, wherein the conveying means is an electric pump.

4. The transmission according to claim 1, wherein the separator is a centrifuge.

5. The transmission according to claim 1, wherein the first throttle, the second throttle, and/or the third throttle are controllable.

6. The transmission according to claim 1, wherein the second throttle is connected to the housing so as to allow flow-through.

7. The transmission according to claim 6, wherein the second throttle is configured to be screwed into the housing.

8. The transmission according to claim 1, wherein the lubrication system comprises a compensating reservoir, which is formed between the lubricant reservoir and the housing.

9. The transmission according to claim 8, wherein the third throttle is configured to control the negative pressure and a positive pressure in the lubricant reservoir.

10. The transmission according to claim 1, wherein a sealing ring of the transmission is configured to be adapted to the negative pressure.

11. The transmission according to claim 1, wherein the lubrication system comprises at least one lubricant filter.

* * * * *